United States Patent
Wei

(10) Patent No.: US 8,923,859 B2
(45) Date of Patent: Dec. 30, 2014

(54) METHOD AND TERMINAL FOR CELL SEARCH

(71) Applicant: Huawei Technologies Co., Ltd., Shenzhen (CN)

(72) Inventor: Jingxin Wei, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/027,447

(22) Filed: Sep. 16, 2013

(65) Prior Publication Data

US 2014/0018072 A1 Jan. 16, 2014

Related U.S. Application Data

(63) Continuation of application No. PCT/CN2011/076259, filed on Jun. 24, 2011.

(51) Int. Cl.
*H04W 4/00* (2009.01)
*H04W 48/16* (2009.01)

(52) U.S. Cl.
CPC .................................... *H04W 48/16* (2013.01)
USPC ........ 455/434; 455/452.1; 370/350; 370/329; 370/280; 370/252; 370/310; 370/342

(58) Field of Classification Search
USPC ............... 455/434, 452.1; 370/350, 329, 280, 370/252, 241, 310, 342
See application file for complete search history.

(56) References Cited

U.S. PATENT DOCUMENTS

| 2009/0041162 A1* | 2/2009 | Li et al. ........................... 375/340 |
| 2010/0159939 A1* | 6/2010 | Jeong et al. .................... 455/450 |
| 2010/0261472 A1 | 10/2010 | Han et al. |
| 2010/0309900 A1* | 12/2010 | Li et al. ......................... 370/342 |

FOREIGN PATENT DOCUMENTS

| CN | 101373988 A | 2/2009 |
| CN | 101689930 A | 3/2010 |
| GB | 2464058 A | 4/2010 |

OTHER PUBLICATIONS

Foreign Communication From a Counterpart Application, PCT Application No. PCT/CN2011/076259, Chinese Search Report dated Apr. 5, 2012, 6 pages.
Foreign Communication From a Counterpart Application, PCT Application No. PCT/CN2011/076259, Chinese Written Opinion dated Apr. 5, 2012, 4 pages.

* cited by examiner

*Primary Examiner* — Joseph Arevalo
(74) *Attorney, Agent, or Firm* — Conley Rose, P.C.; Grant Rodolph; Nicolas K. Beaulieu

(57) ABSTRACT

Embodiments of the present invention provide a method and terminal for a cell search that are related to the communications field. The terminal includes: two spaces, a first processing module, a first processing unit, and a second processing unit. The present invention can ensure that a cell search result exists in each time unit, thereby accelerating an initial search and shortening an initial search delay.

12 Claims, 4 Drawing Sheets

METHOD AND TERMINAL FOR CELL SEARCH

CROSS-REFERENCE TO RELATED APPLICATION

This application is a continuation of International Application No. PCT/CN2011/076259, filed on Jun. 24, 2011, which is hereby incorporated by reference in its entirety.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to the communications field, and in particular, to a method and terminal for a cell search.

BACKGROUND

On a communications network, when a terminal is powered on, it searches for a cell and finds a cell as soon as possible for camping. After successfully camping on a certain cell, the terminal may further search for an intra-frequency neighboring cell or an inter-frequency neighboring cell to make preparation for cell reselection or handover.

In the prior art, a pipeline-based method for a cell search is provided and the method adopts a multiframe accumulation method to improve cell search performance. The method is specifically as follows: calculating primary synchronization signal (PSS) relevant information in a corresponding time unit according to a time-domain signal received by a terminal in each time unit, calculating secondary synchronization signal (SSS) relevant information in a second time unit according to PSS relevant information calculated in a first time unit and a time-domain signal received by the terminal in the second time unit, and caching the SSS relevant information in the second time unit; calculating SSS relevant information in a third time unit according to the PSS relevant information calculated in the first time unit and a time-domain signal received by the terminal in the third time unit, accumulating the SSS relevant information in the third time unit and the cached SSS relevant information, calculating a cell search result according to the accumulated SSS relevant information, and clearing the cached SSS relevant information; calculating SSS relevant information in a fourth time unit according to PSS relevant information calculated in the third time unit and a time-domain signal received by the terminal in the fourth time unit and caching the SSS relevant information in the fourth time unit; and calculating SSS relevant information in a fifth time unit according to the PSS relevant information calculated in the third time unit and a time-domain signal received by the terminal in the fifth time unit, accumulating the SSS relevant information in the fifth time unit and the cached SSS relevant information, calculating a cell search result according to the accumulated SSS relevant information, and clearing the cached SSS relevant information. If the search continues, the preceding process is repeated and the number of accumulations can be set as required.

During implementation of the present invention, the inventor finds at least the following problems in the prior art:

The pipeline-based method for a cell search cannot ensure that a cell search result exists in each time unit. For example, in the preceding process, no cell search results are calculated in the second time unit and the fourth time unit. This slows down an initial search and leads to a long search delay.

SUMMARY

To reduce a search delay while ensuring the search performance, the present invention provides a method and system for a cell search. The technical solutions are as follows:

A method for a cell search, including: obtaining primary synchronization signal PSS relevant information in each time unit by calculation according to a time-domain signal received by a terminal in each time unit; calculating first secondary synchronization signal SSS relevant information in an $i^{th}$ time unit of a cycle segment according to PSS relevant information in a previous time unit of the cycle segment and a time-domain signal received by the terminal in the $i^{th}$ time unit of the cycle segment, accumulating the first SSS relevant information in the $i^{th}$ time unit and SSS relevant information cached in a first space to obtain first accumulated SSS relevant information, updating the SSS relevant information cached in the first space to the first accumulated SSS relevant information, where i is an integer, and calculating a cell search result according to the first accumulated SSS relevant information when i is an odd number; and calculating second SSS relevant information in the $i^{th}$ time unit according to PSS relevant information in a first time unit in the cycle segment and the time-domain signal received by the terminal in the $i^{th}$ time unit, accumulating the second SSS relevant information in the $i^{th}$ time unit and SSS relevant information cached in the second space to obtain second accumulated SSS relevant information, updating the SSS relevant information cached in the second space to the second accumulated SSS relevant information, and calculating a cell search result according to the second accumulated SSS relevant information when i is an even number.

A terminal for a cell search, including a first processing module, a first processing unit, and a second processing unit, where: the first processing module is configured to obtain primary synchronization signal PSS relevant information in each time unit by calculation according to a time-domain signal received by the terminal in each time unit; the first processing unit is configured to calculate first secondary synchronization signal SSS relevant information in an $i^{th}$ time unit of a cycle segment according to PSS relevant information calculated in a previous time unit of the cycle segment and a time-domain signal received by the terminal in the $i^{th}$ time unit of the cycle segment, accumulate the first SSS relevant information in the $i^{th}$ time unit and SSS relevant information cached in a first space to obtain first accumulated SSS relevant information, update the SSS relevant information cached in the first space to the first accumulated SSS relevant information, where i is an integer, and calculate a cell search result according to the first accumulated SSS relevant information when i is an odd number; and the second processing unit is configured to calculate second SSS relevant information in the $i^{th}$ time unit according to PSS relevant information in a first time unit in the cycle segment and the time-domain signal received by the terminal in the $i^{th}$ time unit, accumulate the second SSS relevant information in the $i^{th}$ time unit and SSS relevant information cached in the second space to obtain second accumulated SSS relevant information, update the SSS relevant information cached in the second space to the second accumulated SSS relevant information, and calculate a cell search result according to the second accumulated SSS relevant information when i is an even number.

In the present invention, two sets of independent resources for calculating cell search results exist on a terminal, the two sets of independent resources for calculating cell search results calculate, starting from a third time unit, cell search results in turn, and a cell search result is calculated based on multiframe accumulation each time. This improves search performance and ensures that a cell search result exists in each time unit, thereby accelerating an initial search and shortening an initial search delay.

DETAILED DESCRIPTION

To make the objectives, technical solutions, and advantages of the present invention more comprehensible, the following further describes the embodiments of the present invention in detail with reference to the accompanying drawings.

Embodiment 1

Figure 1:
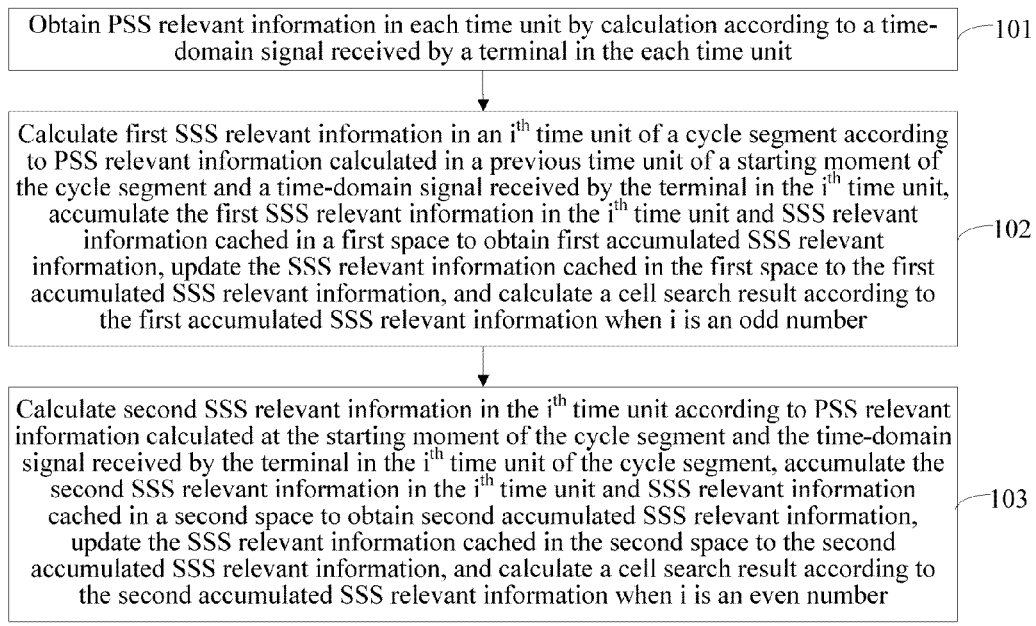
FIG. 1 is a flowchart of a method for a cell search according to Embodiment 1 of the present invention.

As shown in FIG. 1, this embodiment of the present invention provides a method for a cell search, including:

Step 101: Obtain PSS relevant information in each time unit by calculation according to a time-domain signal received by a terminal in each time unit.

The PSS relevant information at least includes an intra-group number and a PSS symbol synchronization position.

Step 102: Calculate first SSS relevant information in an $i^{th}$ time unit according to PSS relevant information calculated in a previous time unit of a starting moment of the cycle segment and a time-domain signal received by the terminal in the $i^{th}$ time unit of the cycle segment, accumulate the first SSS relevant information in the $i^{th}$ time unit and SSS relevant information cached in a first space to obtain first accumulated SSS relevant information, update the SSS relevant information cached in the first space to the first accumulated SSS relevant information, and calculate a cell search result according to the first accumulated SSS relevant information when i is an odd number.

The cell search result at least includes a cell identity (ID), a cyclic prefix (CP) type, and a frame synchronization position. The SSS relevant information at least includes an SSS signal correlation value.

Step 103: Calculate second SSS relevant information in the $i^{th}$ time unit according to PSS relevant information calculated at the starting moment of the cycle segment and the time-domain signal received by the terminal in the $i^{th}$ time unit of the cycle segment, accumulate the second SSS relevant information in the $i^{th}$ time unit and SSS relevant information cached in a second space to obtain second accumulated SSS relevant information, update the SSS relevant information cached in the second space to the second accumulated SSS relevant information, and calculate a cell search result according to the second accumulated SSS relevant information when i is an even number.

The space in this embodiment is the storage space used to store information and may be implemented by using a memory.

In this embodiment of the present invention, two sets of independent resources for calculating cell search results exist on a terminal, the two sets of independent resources for calculating cell search results calculate, starting from a third time unit, cell search results in turn, and a cell search result is calculated based on multiframe accumulation each time. This improves search performance and ensures that a cell search result exists in each time unit, thereby accelerating an initial search and shortening an initial search delay.

Embodiment 2

This embodiment of the present invention provides a method for a cell search.

In the present invention, a cell search can be classified into an initial search stage and a neighboring cell search stage. When a terminal is powered on, the terminal first enters the initial search stage. At the initial search stage, the terminal searches for a cell as soon as possible and camps on a found cell. After completing the initial search stage, the terminal enters the neighboring cell search stage. At the neighboring cell search stage, the terminal searches for an intra-frequency neighboring cell or an inter-frequency neighboring cell to make preparation for an operation, such as cell reselection or cell handover.

In a long term evolution (LTE) system, the terminal receives a time-domain signal transmitted by a base station and uses PSS signals and SSS signals in the received time-domain signal to complete the cell search. It is assumed that 504 cells exist at the physical layer of the LTE system, they are grouped into 168 groups, and each group has three different cells. An identity of each cell may be expressed by using the following formula (1):

$$N_{ID}^{cell}=3N_{ID}^{(1)}+N_{ID}^{(2)} \qquad (1)$$

where in formula (1), $N_{ID}^{(1)}$ is a group number ranging from 0 to 167, $N_{ID}^{(2)}$ is an intra-group number ranging from 0 to 2, and $N_{ID}^{cell}$ is a cell identity. There are 504 cell identities in total.

The group number $N_{ID}^{(1)}$ is determined according to the SSS signals, and therefore there are 168 SSS signals in total. The intra-group number $N_{ID}^{(2)}$ is determined according to the PSS signals, and therefore there are three PSS signals in total.

The time-domain signal transmitted by the base station to the terminal is formed by data frames, and each data frame includes ten subframes. A data frame includes two structures: a frequency division duplexing (FDD) data frame and a time division duplexing (TDD) data frame. In an FDD data frame, both PSS signals and SSS signals are located in a $0^{th}$ subframe and a fifth subframe; that is, the base station transmits the PSS signals and the SSS signals in the $0^{th}$ subframe and fifth subframe of each FDD data frame. In a TDD data frame, PSS signals are located in a $0^{th}$ subframe and a fifth subframe, and SSS signals are located in a first subframe and a sixth subframe; that is, the base station transmits the PSS signals in the $0^{th}$ subframe and fifth subframe of each TDD data frame and transmits the SSS signals in the first subframe and sixth subframe of each TDD data frame.

Two PSS signals included in each data frame are the same whereas two SSS signals included in each data frame are different. Therefore, a PSS signal repeats once every five subframes, that is, one PSS signal repetition cycle includes five subframes. An SSS signal repeats once every ten subframes; that is, one SSS signal repetition cycle includes ten subframes.

Regardless of the initial search stage or the neighboring cell search stage, the following two steps of performing a cell search by the terminal are included:

A first step: The terminal performs calculation according to a time-domain signal received in a time unit and calculates PSS relevant information, where the PSS relevant information at least includes a PSS symbol synchronization position and an intra-group number $N_{ID}^{(2)}$.

A time unit includes a cycle length of one or more PSS signal repetition cycles.

Specifically, the terminal performs, according to a locally stored PSS signal, non-coherent detection for the received time-domain signal in a time unit and detects the PSS symbol synchronization position and the intra-group number $N_{ID}^{(2)}$.

If the terminal is at the initial search stage, the PSS relevant information further includes a frequency offset estimation value. Further, the first step further includes: extracting PSS signals from the time-domain signal in a time unit according to the PSS symbol synchronization position and performing frequency offset estimation for the extracted PSS signals to obtain the frequency offset estimation value.

A second step: The terminal calculates SSS relevant information according to the PSS relevant information calculated in the first step and the received time-domain signal in a time unit and calculates a cell search result according to the SSS relevant information, where the cell search result at least includes a cell identity $N_{ID}^{cell}$, a frame synchronization position, and a CP type.

Specifically, the terminal uses the PSS symbol synchronization position obtained by calculation in the first step to extract SSS signals from the received time-domain signal in a time unit, performs coherent detection on the extracted SSS signals to obtain the SSS relevant information, determines a group number $N_{ID}^{(1)}$, the frame synchronization position, and the CP type according to the calculated SSS relevant information, and calculates the cell identity $N_{ID}^{cell}$ according to the intra-group number $N_{ID}^{(2)}$ obtained in the first step and the determined group number $N_{ID}^{(1)}$ and by using the preceding formula (1).

If the terminal is at the initial search stage, before calculating the SSS relevant information, the terminal further uses the frequency offset estimation value obtained in the first step to perform a frequency offset correction on the received time-domain signal in a time unit. In addition, the SSS relevant information at least includes an SSS signal correlation value.

In this embodiment, the terminal performs the cell search by referring to a working pattern, where the working pattern is formed by one starting segment and one or more cycle segments following the starting segment, and any starting segment and any cycle segment both occupy multiple time units. In any starting segment and any cycle segment, a first processing module completes the first step of the cell search, and a second processing module completes the second step of the cell search, where the second processing module includes two independent processing units and two independent storage spaces. The two processing units include a first processing unit and a second processing unit, the two storage spaces include a first space and a second space, the first processing unit is in one-to-one correspondence with the first space, and the second processing unit is in one-to-one correspondence with the second space. In addition, the first processing unit and the second processing unit complete the second step of the cell search independently according to PSS relevant information calculated by the first processing module and a time-domain signal received by the terminal in a time unit.

In each time unit in the entire working pattern, the first processing module calculates PSS relevant information according to a time-domain signal received by the terminal in each time unit. Starting from a second time unit in the working pattern, any processing unit in the second processing module starts to calculate a cell search result according to the PSS relevant information calculated by the first processing module and a time-domain signal received by the terminal in the second time unit. Starting from a third time unit, the two processing units in the second processing module calculate cell search results independently by using the PSS relevant information calculated by the first processing module and the time-domain signal received by the terminal in a time unit. In addition, the two processing units output the cell search results in turn starting from the third time unit.

For a specific operation of calculating, by the first processing module, the PSS relevant information according to the time-domain signal received by the terminal, reference may be made to the first step of the cell search. For a specific operation of calculating, by the first processing unit and the second processing unit, the SSS relevant information according to the PSS relevant information calculated by the first processing module and the time-domain signal received by the terminal and calculating the cell search results according to the SSS relevant information, reference may be made to the second step of the cell search. In this embodiment of the present invention, in another case, calculating, by the first processing module, cell relevant information, and calculating, by the first processing unit and the second processing unit, SSS relevant information and cell search results are similar to the preceding description. Therefore, no further details are provided herein.

In this embodiment, the starting segment includes M time units, where M is an integer greater than or equal to two.

There are many possible implementation manners for the design of the starting segment. For ease of understanding, several easy manners are illustrated in a trial manner in this embodiment. Of course, even no calculation result is generated in the starting segment, and a calculation result is directly generated in the cycle segment.

Figure 2:
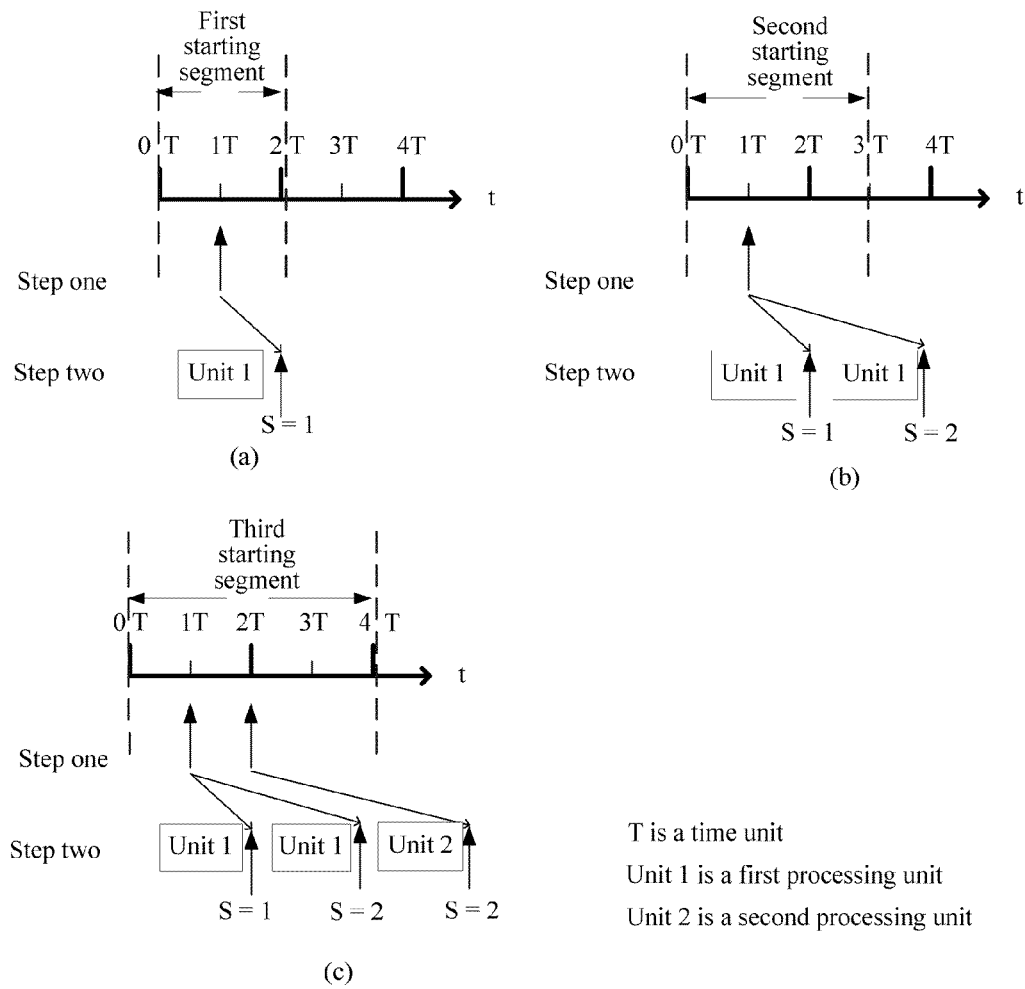
FIG. 2 is a schematic diagram of a starting segment according to Embodiment 2 of the present invention.

When M is two, a first starting segment is shown in FIG. 2-(a) and includes two time units. In the first starting segment, the first processing module calculates PSS relevant information in each time unit according to a time-domain signal received by the terminal in each time unit. In the second time unit, any processing unit, which is assumed to be the first processing unit, in the second processing module calculates a cell search result according to PSS relevant information calculated in the first time unit and a time-domain signal received by the terminal in the second time unit.

When M is three, a second starting segment is shown in FIG. 2-(b) and includes three time units. In the second starting segment, the first processing module calculates PSS relevant information in each time unit according to a time-domain signal received by the terminal in each time unit. In the second time unit, any processing unit, which is assumed to be the first processing unit, in the second processing module calculates SSS relevant information in the second time unit according to PSS relevant information calculated in the first time unit and a time-domain signal received by the terminal in the second time unit, caches the SSS relevant information in the second time unit in the first space, and calculates a cell search result according to the SSS relevant information in the second time unit. In the third time unit, the first processing unit calculates SSS relevant information in the third time unit according to the PSS relevant information calculated in the first time unit and a time-domain signal received by the terminal in the third time unit, accumulates the SSS relevant information in the third time unit and the SSS relevant information cached in the first space, calculates a cell search result according to the accumulated SSS relevant information, and clears the first space.

When M is four, a third starting segment is shown in FIG. 2-(c) and includes four time units. In the third starting segment, the first processing module calculates PSS relevant information in each time unit according to a time-domain signal received by the terminal in each time unit. In the second time unit, any processing unit, which is assumed to be the first processing unit, in the second processing module calculates SSS relevant information in the second time unit according to PSS relevant information calculated in the first time unit and a time-domain signal received by the terminal in the second time unit, caches the SSS relevant information in the second time unit in the first space, and calculates a cell search result according to the SSS relevant information in the second time unit. In the third time unit, the first processing unit calculates SSS relevant information in the third time unit according to the PSS relevant information calculated in the first time unit and a time-domain signal received by the terminal in the third time unit, accumulates the SSS relevant information in the third time unit and the SSS relevant information cached in the first space, calculates a cell search result according to the accumulated SSS relevant information, and clears the first space. Simultaneously, in the third time unit, the second processing unit calculates SSS relevant information in the third time unit according to PSS relevant information calculated in the second time unit and the time-domain signal received by the terminal in the third time unit and caches the SSS relevant information in the third time unit in the second space. In the fourth time unit, the second processing unit continues to calculate SSS relevant information in the fourth time unit according to the PSS relevant information calculated in the second time unit and a time-domain signal received by the terminal in the fourth time unit, accumulates the SSS relevant information in the fourth time unit and the SSS relevant information cached in the second space, calculates a cell search result according to the accumulated SSS relevant information, and clears the second space.

It should be noted that up arrows ↑ at time t in FIG. 2 indicate the output of the first processing module (that is, processing in the first step) and the second processing module (that is, processing in the second step). An S below the up arrow ↑ for the second processing module indicates that an accumulated duration is T×S milliseconds (ms). A slanted arrow ↘ between the up arrows of the first processing module and the second processing module indicates that the processing of the second processing module is based on the output of the first processing at that time. Some of the following accompanying drawings adopt an expression method similar to the expression method in FIG. 2. What is generated by the processing in the first step is the PSS relevant information, and the SSS relevant information is obtained by the processing in the second step based on the existing PSS relevant information.

The cycle segment is located behind the starting segment. Therefore, in a previous time unit of a starting moment of the cycle segment, the first processing module has calculated the PSS relevant information.

The cycle segment includes N time units, and N is an integer greater than or equal to three. The first processing module performs calculation according to a time-domain signal received by the terminal in each time unit and calculates PSS relevant information at an ending moment of each time unit. Any processing unit, which is assumed to be the first processing unit, in the second processing module calculates SSS relevant information in the previous time unit of the starting moment of the cycle segment according to PSS relevant information calculated in the previous time unit of the starting moment of the cycle segment and a time-domain signal received by the terminal in the previous time unit of the starting moment of the cycle segment, and caches the SSS relevant information in the previous time unit of the starting moment of the cycle segment in the first space. The first processing unit calculates SSS relevant information in $i^{th}$ an i time unit according to the PSS relevant information calculated in the previous time unit of the starting moment of the cycle segment and a time-domain signal received by the terminal in the $i^{th}$ time unit of the cycle segment, accumulates the SSS relevant information in the $i^{th}$ time unit and the SSS relevant information cached in the first space, and updates the SSS relevant information cached in the first space to the accumulated SSS relevant information, where i is an integer ranging from 1 to N−2. When i is an odd number, a cell search result is calculated according to the accumulated SSS relevant information. The second processing unit calculates SSS relevant information in the $i^{th}$ time unit according to PSS relevant information calculated at the starting moment of the cycle segment and the time-domain signal received by the terminal in the $i^{th}$ time unit of the cycle segment, accumulates the SSS relevant information in the $i^{th}$ time unit and SSS relevant information cached in the second space, and updates the SSS relevant information cached in the second space to the accumulated SSS relevant information. When i is an even number, a cell search result is calculated according to the accumulated SSS relevant information.

If N is an even number, in an $(N-1)^{th}$ time unit of the cycle segment, the first processing unit calculates SSS relevant information in the $(N-1)^{th}$ time unit according to PSS relevant information calculated in the previous time unit of the starting moment of the cycle segment and a time-domain signal received by the terminal in the $(N-1)^{th}$ time unit, accumulates the SSS relevant information in the $(N-1)^{th}$ time unit and the SSS relevant information cached in the first space, calculates a cell search result according to the accumulated SSS relevant information, and clears the SSS relevant information cached in the first space. In addition, the second processing unit calculates SSS relevant information in the $(N-1)^{th}$ time unit according to PSS relevant information calculated at the starting moment of the cycle segment and the time-domain signal received by the terminal in the $(N-1)^{th}$ time unit of the cycle segment, accumulates the SSS relevant information in the $(N-1)^{th}$ time unit and the SSS relevant information cached in the second space, and updates the SSS relevant information cached in the second space to the accumulated SSS relevant information. In an $N^{th}$ time unit, the second processing unit calculates SSS relevant information in the $N^{th}$ time unit according to the PSS relevant information calculated at the starting moment of the cycle segment and a time-domain signal received by the terminal in the $N^{th}$ time unit of the cycle segment, accumulates the SSS relevant information in the $N^{th}$ time unit and the SSS relevant information cached in the second space, calculates a cell search result according to the accumulated SSS relevant information, and clears the SSS relevant information cached in the second space.

If N is an odd number, in an $(N-1)^{th}$ time unit of the cycle segment, the second processing unit calculates SSS relevant information in the $(N-1)^{th}$ time unit according to PSS relevant information calculated at the starting moment of the cycle segment and a time-domain signal received by the terminal in the $(N-1)^{th}$ time unit of the cycle segment, accumulates the SSS relevant information in the $(N-1)^{th}$ time unit and the SSS relevant information cached in the second space, calculates a cell search result according to the accumulated SSS relevant information, and clears the SSS relevant information cached in the second space. In addition, the first processing unit calculates SSS relevant information in the $(N-1)^{th}$ time unit according to PSS relevant information calculated in a previous time unit of the starting moment of the cycle segment and the time-domain signal received by the terminal in the $(N-1)^{th}$ time unit of the cycle segment, accumulates the SSS relevant information in the $(N-1)^{th}$ time unit and the SSS relevant information cached in the first space, and updates the SSS relevant information cached in the first space to the accumulated SSS relevant information. In the $N^{th}$ time unit of the cycle segment, the first processing unit calculates SSS relevant information in the $N^{th}$ time unit according to the PSS relevant information calculated in the previous time unit of the starting moment of the cycle segment and a time-domain signal received by the terminal in the $N^{th}$ time unit of the cycle segment, accumulates the SSS relevant information in the $N^{th}$ time unit and the SSS relevant information cached in the first space, calculates a cell search result according to the accumulated SSS relevant information, and clears the SSS relevant information cached in the first space.

A first cycle segment and a second cycle segment shown in the following are used as examples.

Figure 3:
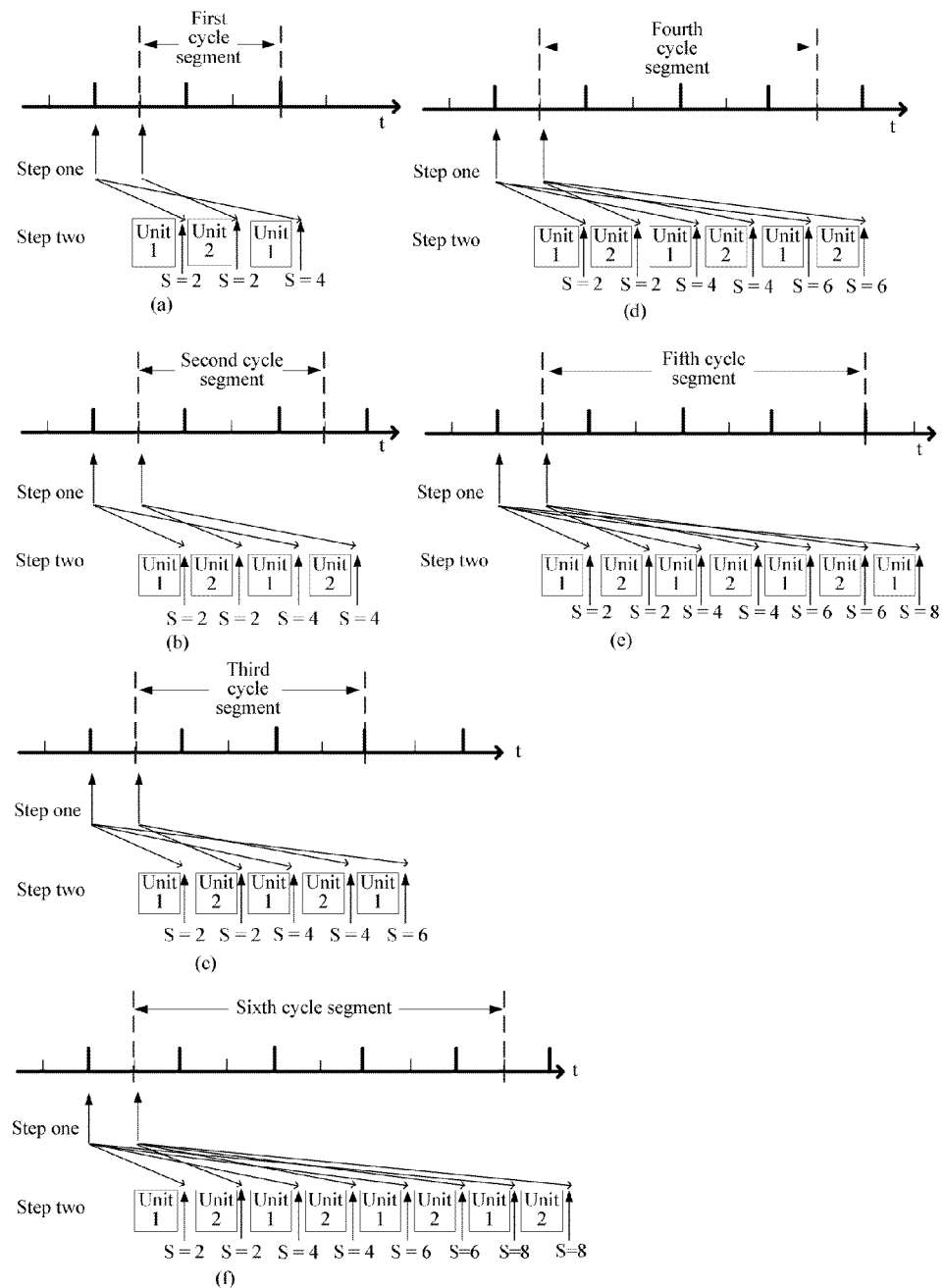
FIG. 3 is a schematic diagram of a cycle segment according to Embodiment 2 of the present invention.

The first cycle segment is shown in FIG. 3-(a) and includes three time units. The first processing module calculates PSS relevant information in each time unit according to a time-domain signal received by the terminal in each time unit. Any processing unit, which is assumed to be the first processing unit, in the second processing module calculates SSS relevant information in a previous time unit of a starting moment of the first cycle segment according to PSS relevant information calculated in the previous time unit of the starting moment of the first cycle segment and a time-domain signal received by the terminal in the previous time unit of the starting moment of the first cycle segment, and caches the SSS relevant information in the previous time unit of the starting moment of the first cycle segment in the first space. In the first time unit of the first cycle segment, the first processing unit calculates SSS relevant information in the first time unit according to the PSS relevant information calculated in the previous time unit of the starting moment of the first cycle segment and a time-domain signal received by the terminal in the first time unit of the first cycle segment, accumulates the SSS relevant information in the first time unit and the SSS relevant information cached in the first space, updates an SSS correlation value cached in the first space to an accumulated SSS correlation value, and calculates a cell search result according to the accumulated SSS relevant information. Simultaneously, in the first time unit of the cycle segment, the second processing unit obtains SSS relevant information in the first time unit by calculation according to PSS relevant information calculated at the starting moment of the first cycle segment and the time-domain signal received by the terminal in the first time unit, and caches the SSS relevant information in the first time unit in the second space. In the second time unit of the first cycle segment, the second processing unit continues to calculate SSS relevant information in the second time unit according to the PSS relevant information calculated at the starting moment of the first cycle segment and a time-domain signal received by the terminal in the second time unit, accumulates the SSS relevant information in the second time unit and an SSS correlation value cached in the second space, calculates a cell search result according to the accumulated SSS relevant information, and clears the second space. Simultaneously, in the second time unit of the first cycle segment, the first processing unit continues to calculate SSS relevant information in the second time unit according to the PSS relevant information calculated in the previous time unit of the starting moment of the first cycle segment and the time-domain signal received by the terminal in the second time unit, accumulates the SSS relevant information cached in the first space and the SSS relevant information in the second time unit, and updates the SSS relevant information cached in the first space to the accumulated SSS relevant information. In the third time unit of the first cycle segment, the first processing unit continues to calculate SSS relevant information in the third time unit according to the PSS relevant information calculated in the previous time unit of the starting moment of the first cycle segment and a time-domain signal received by the terminal in the third time unit, accumulates the SSS relevant information in the third time unit and the SSS relevant information cached in the first space, calculates a cell search result according to the accumulated SSS relevant information, and clears the first space.

The second cycle segment is shown in FIG. 3-(b) and includes four time units. The first processing module calculates PSS relevant information in each time unit according to a time-domain signal received by the terminal in each time unit. Any processing unit, which is assumed to be the first processing unit, in the second processing module calculates SSS relevant information in a previous time unit of a starting moment of the second cycle segment according to PSS relevant information calculated in the previous time unit of the starting moment of the second cycle segment and a time-domain signal received by the terminal in the previous time unit of the starting moment of the second cycle segment, and caches the SSS relevant information in the previous time unit of the starting moment of the second cycle segment in the first space. In the first time unit of the second cycle segment, the first processing unit calculates SSS relevant information in the first time unit according to the PSS relevant information calculated in the previous time unit of the starting moment of the first cycle segment and a time-domain signal received by the terminal in the first time unit, accumulates the SSS relevant information in the first time unit and the SSS relevant information cached in the first space, updates the SSS relevant information cached in the first space to the accumulated SSS relevant information, and calculates a cell search result according to the accumulated SSS relevant information. Simultaneously, in the first time unit of the second cycle segment, the second processing unit calculates SSS relevant information in the first time unit according to PSS relevant information calculated at the starting moment of the second cycle segment and the time-domain signal received by the terminal in the first time unit, and caches the SSS relevant information in the first time unit in the second space. In the second time unit of the second cycle segment, the second processing unit continues to calculate SSS relevant information in the second time unit according to the PSS relevant information calculated at the starting moment of the second cycle segment and a time-domain signal received by the terminal in the second time unit, accumulates the SSS relevant information in the second time unit and an SSS correlation value cached in the second space, updates the SSS relevant information in the second space to the accumulated SSS relevant information, and calculates a cell search result according to the accumulated SSS relevant information. Simultaneously, in the second time unit of the second cycle segment, the first processing unit continues to calculate SSS relevant information in the second time unit according to the PSS relevant information calculated in the previous time unit of the starting moment of the second cycle segment and the time-domain signal received by the terminal in the second time unit, accumulates the SSS relevant information cached in the first space and the SSS relevant information in the second time unit, and updates the SSS relevant information cached in the first space to the accumulated SSS relevant information. In the third time unit of the second cycle segment, the first processing unit continues to calculate SSS relevant information in the third time unit according to the PSS relevant information calculated in the previous time unit of the starting moment of the first cycle segment and a time-domain signal received by the terminal in the third time unit, accumulates the SSS relevant information in the third time unit and the SSS relevant information cached in the first space, calculates a cell search result according to the accumulated SSS relevant information, and clears the first space. Simultaneously, in the third time unit, the second processing unit continues to calculate SSS relevant information in the third time unit according to the PSS relevant information calculated by the first processing module at the starting moment of the second cycle segment and the time-domain signal received by the terminal in the third time unit, accumulates the SSS relevant information in the third time unit and the SSS correlation value cached in the second space, and updates the SSS relevant information cached in the second space to the accumulated SSS relevant information. In the fourth time unit, the second processing unit continues to calculate SSS relevant information in the fourth time unit according to the PSS relevant information calculated at the starting moment of the second cycle segment and a time-domain signal received by the terminal in the fourth time unit, accumulates the SSS relevant information in the fourth time unit and the SSS correlation value cached in the second space, calculates a cell search result according to the accumulated SSS relevant information, and clears the second space.

A user may set according to a requirement that a cycle segment occupies more time units. For example, for a third cycle segment shown in FIG. 3-(c), it may be set that the third cycle segment includes five time units; for a fourth cycle segment shown in FIG. 3-(d), it may be set that the fourth cycle segment includes six time units; for a fifth cycle segment shown in FIG. 3-(e), it may be set that the fifth cycle segment includes seven time units; and for a sixth cycle segment shown in FIG. 3-(f), it may be set that the sixth cycle segment includes eight time units.

Figure 4:
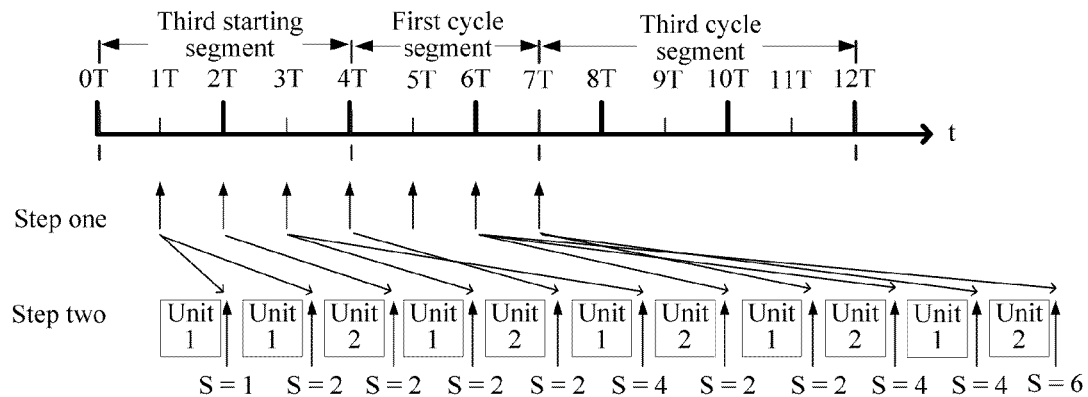
FIG. 4 is a schematic diagram of a working pattern according to Embodiment 2 of the present invention.

The terminal performs the cell search by referring to the working pattern, where the working pattern is formed by cascading one starting segment and one or more cycle segments following the starting segment. For example, in this embodiment, reference is made by the terminal to the working pattern shown in FIG. 4, and the working pattern shown in FIG. 4 is a working pattern formed by cascading a third starting segment, a second cycle segment, and a third cycle segment. The method includes:

Step 201: The first processing module performs calculation according to a time-domain signal received by the terminal in each time unit and calculates PSS relevant information in each time unit.

Step 202: In a second time unit, the first processing unit calculates SSS relevant information in the second time unit according to PSS relevant information calculated in a first time unit and a time-domain signal received by the terminal in the second time unit, caches the SSS relevant information in the second time unit in one space, which is assumed to be the first space, of two spaces, and calculates a cell search result according to the SSS relevant information in the second time unit.

Step 203: In a third time unit, the first processing unit calculates SSS relevant information in the third time unit according to the PSS relevant information calculated in the first time unit and a time-domain signal received by the terminal in the third time unit, accumulates the SSS relevant information in the third time unit and the SSS relevant information cached in the first space, calculates a cell search result according to the accumulated SSS relevant information, and clears the first space.

Step 204: Simultaneously, in the third time unit, the second processing unit calculates SSS relevant information in the third time unit according to PSS relevant information calculated in the second time unit and the time-domain signal received by the terminal in the third time unit, and caches the SSS relevant information in the third time unit in the second space.

Step 203 and step 204 are executed in the third time unit, so there is no strict order for step 203 and step 204. In addition, in this embodiment, there is no strict order for two execution steps in another case where the two execution steps take place in a same time unit. Therefore, no further description is provided herein.

Step 205: In a fourth time unit, the second processing unit calculates SSS relevant information in the fourth time unit according to the PSS relevant information calculated in the second time unit and a time-domain signal received by the terminal in the fourth time unit, accumulates the SSS relevant information in the fourth time unit and the SSS relevant information cached in the second space, calculates a cell search result according to the accumulated SSS relevant information, and clears the second space.

Step 206: Simultaneously, in the fourth time unit, the first processing unit calculates SSS relevant information in the fourth time unit according to PSS relevant information calculated in the third time unit and the time-domain signal received by the terminal in the fourth time unit, and caches the SSS relevant information in the fourth time unit in the first space.

Step 207: In a fifth time unit, the first processing unit calculates SSS relevant information in the fifth time unit according to the PSS relevant information calculated in the third time unit and a time-domain signal received by the terminal in the fifth time unit, accumulates the SSS relevant information in the fifth time unit and the SSS relevant information cached in the first space, calculates a cell search result according to the accumulated SSS relevant information, and updates the SSS relevant information cached in the first space to the accumulated SSS relevant information.

Step 208: Simultaneously, in the fifth time unit, the second processing unit calculates SSS relevant information in the fifth time unit according to PSS relevant information calculated in the fourth time unit and the time-domain signal received by the terminal in the fifth time unit, and caches the SSS relevant information in the fifth time unit in the second space.

Step 209: In a sixth time unit, the second processing unit calculates SSS relevant information in the sixth time unit according to the PSS relevant information calculated in the fourth time unit and a time-domain signal received by the terminal in the sixth time unit, accumulates the SSS relevant information in the sixth time unit and the SSS relevant information cached in the second space, calculates a cell search result according to the accumulated SSS relevant information, and clears the second space.

Step 210: Simultaneously, in the sixth time unit, the first processing unit calculates SSS relevant information in the sixth time unit according to the PSS relevant information calculated in the third time unit and the time-domain signal received by the terminal in the sixth time unit, accumulates the SSS relevant information in the sixth time unit and the SSS relevant information cached in the first space, and updates the SSS relevant information cached in the first space to the accumulated SSS relevant information.

Step 211: In a seventh time unit, the first processing unit calculates SSS relevant information in the seventh time unit according to the PSS relevant information calculated in the third time unit and a time-domain signal received by the terminal in the seventh time unit, accumulates the SSS relevant information in the seventh time unit and the SSS relevant information cached in the first space, calculates a cell search result according to the accumulated SSS relevant information, and clears the first space.

Step 212: Simultaneously, in the seventh time unit, the second processing unit calculates SSS relevant information in the seventh time unit according to PSS relevant information calculated in the sixth time unit and the time-domain signal received by the terminal in the seventh time unit, and caches the SSS relevant information in the seventh time unit in the second space.

Step 213: In an eighth time unit, the second processing unit calculates SSS relevant information in the eighth time unit according to the PSS relevant information calculated in the sixth time unit and a time-domain signal received by the terminal in the eighth time unit, accumulates the SSS relevant information in the eighth time unit and the SSS relevant information cached in the second space, calculates a cell search result according to the accumulated SSS relevant information, and updates the SSS relevant information cached in the second space to the accumulated SSS relevant information.

Step 214: Simultaneously, in the eighth time unit, the first processing unit calculates SSS relevant information in the eighth time unit according to PSS relevant information calculated in the seventh time unit and the time-domain signal received by the terminal in the eighth time unit, and caches the SSS relevant information in the eighth time unit in the first space.

Step 215: In a ninth time unit, the first processing unit calculates SSS relevant information in the ninth time unit according to the PSS relevant information calculated in the seventh time unit and a time-domain signal received by the terminal in the ninth time unit, accumulates the SSS relevant information in the ninth time unit and the SSS relevant information cached in the first space, calculates a cell search result according to the accumulated SSS relevant information, and updates the SSS relevant information cached in the first space to the accumulated SSS relevant information.

Step 216: Simultaneously, in the ninth time unit, the second processing unit calculates SSS relevant information in the ninth time unit according to the PSS relevant information calculated in the sixth time unit and the time-domain signal received by the terminal in the ninth time unit, accumulates the SSS relevant information in the ninth time unit and the SSS relevant information cached in the second space, and updates the SSS relevant information cached in the second space to the accumulated SSS relevant information.

Step 217: In a tenth time unit, the second processing unit calculates SSS relevant information in the tenth time unit according to the PSS relevant information calculated in the sixth time unit and a time-domain signal received by the terminal in the tenth time unit, accumulates the SSS relevant information in the tenth time unit and the SSS relevant information cached in the second space, calculates a cell search result according to the accumulated SSS relevant information, and updates the SSS relevant information cached in the second space to the accumulated SSS relevant information.

Step 218: Simultaneously, in the tenth time unit, the first processing unit calculates SSS relevant information in the tenth time unit according to the PSS relevant information calculated in the seventh time unit and the time-domain signal received by the terminal in the tenth time unit, accumulates the SSS relevant information in the tenth time unit and the SSS relevant information cached in the first space, and updates the SSS relevant information cached in the first space to the accumulated SSS relevant information.

Step 219: In an eleventh time unit, the first processing unit calculates SSS relevant information in the eleventh time unit according to the PSS relevant information calculated in the seventh time unit and a time-domain signal received by the terminal in the eleventh time unit, accumulates the SSS relevant information in the eleventh time unit and the SSS relevant information cached in the first space, calculates a cell search result according to the accumulated SSS relevant information, and clears the first space.

Step 220: Simultaneously, in the eleventh time unit, the second processing unit calculates SSS relevant information in the eleventh time unit according to the PSS relevant information calculated in the sixth time unit and the time-domain signal received by the terminal in the eleventh time unit, accumulates the SSS relevant information in the eleventh time unit and the SSS relevant information cached in the second space, and updates the SSS relevant information cached in the second space to the accumulated SSS relevant information.

Step 221: In a twelfth time unit, the second processing unit calculates SSS relevant information in the twelfth time unit according to the PSS relevant information calculated in the sixth time unit and a time-domain signal received by the terminal in the twelfth time unit, accumulates the SSS relevant information in the twelfth time unit and the SSS relevant information cached in the second space, calculates a cell search result according to the accumulated SSS relevant information, and clears the second space.

After step 222 is executed, the execution for the entire working pattern is complete and the terminal completes the cell search. The working pattern is formed by cascading one starting segment and one or more cycle segments. The user is capable of selecting the starting segment and selecting the cycle segments as required and cascading the selected starting segment and cycle segments to form a working pattern. Then, the terminal performs a cell search by referring to the working pattern formed by the cascading. The principle of performing, by the terminal, a cell search by referring to each working pattern is the same as the execution process in this embodiment. Therefore, no further description is provided herein.

The initial search stage and the neighboring cell search stage both include preset times of cell search results. It is assumed that 15 cell search results are required to complete the initial search stage and 12 cell search results are required to complete the neighboring cell search stage. In this embodiment, a cell search result is calculated in each time unit, thereby reducing delays at the initial search stage and the neighboring cell search stage.

In this embodiment of the present invention, starting from a third time unit, a terminal calculates cell search results in turn by using a first processing unit and a second processing unit, and a cell search result is calculated based on multiframe accumulation each time. This improves search performance and ensures that a cell search result exists in each time unit, thereby accelerating an initial search and shortening an initial search delay.

Embodiment 3

Figure 5:
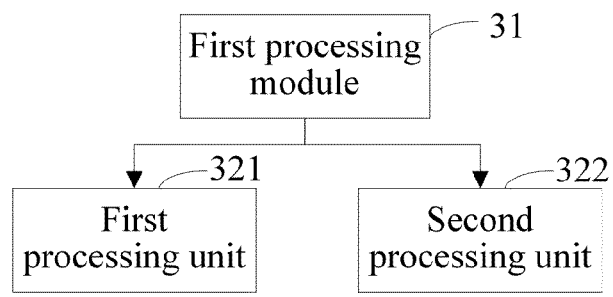
FIG. 5 is a terminal for a cell search according to Embodiment 3 of the present invention.

As shown in FIG. 5, this embodiment of the present invention provides a terminal for a cell search, including a first processing module 31, a first processing unit 321, and a second processing unit 322, where the first processing unit 321 and the second processing unit 322 may be located in a second processing module. This is not limited in this embodiment.

The first processing module 31 is configured to obtain PSS relevant information in each time unit by calculation according to a time-domain signal received by the terminal in each time unit and the first processing module 31 may be a processor.

The first processing unit 321 is configured to calculate first SSS relevant information in an $i^{th}$ time unit of a cycle segment according to PSS relevant information calculated in a previous time unit of a starting moment of the cycle segment and a time-domain signal received by the terminal in the $i^{th}$ time unit of the cycle segment, accumulate the first SSS relevant information in the $i^{th}$ time unit and SSS relevant information cached in a first space to obtain first accumulated SSS relevant information, update the SSS relevant information cached in the first space to the first accumulated SSS relevant information, and calculate a cell search result according to the first accumulated SSS relevant information when i is an odd number.

The second processing unit 322 is configured to calculate second SSS relevant information in the $i^{th}$ time unit according to PSS relevant information calculated at the starting moment of the cycle segment and the time-domain signal received by the terminal in the $i^{th}$ time unit, accumulate the second SSS relevant information in the $i^{th}$ time unit and SSS relevant information cached in a second space to obtain second accumulated SSS relevant information, update the SSS relevant information cached in the second space to the second accumulated SSS relevant information, and calculate a cell search result according to the second accumulated SSS relevant information when i is an even number.

The first processing unit 321 and the second processing unit 322 each may be a processor, and the first space and the second space are storage spaces used to store information. The first space and the second space each can be implemented by using a memory.

Further, the first processing unit 321 is further configured to calculate SSS relevant information in a previous time unit of the cycle segment according to PSS relevant information in the previous time unit of the cycle segment and a time-domain signal received by the terminal in the previous time unit of the cycle segment, and cache the SSS relevant information in the previous time unit of the cycle segment in the first space.

Further, the first processing unit 321 is further configured to clear the first space after calculating the cell search result according to the first accumulated SSS relevant information.

The second processing unit 322 is further configured to clear the second space after calculating the cell search result according to the second accumulated SSS relevant information.

A starting segment is further included before the cycle segment, where the starting segment includes at least two time units.

Accordingly, the first processing unit 321 is further configured to calculate SSS relevant information in a second time unit according to PSS relevant information calculated in a first time unit of the starting segment and a time-domain signal received by the terminal in the second time unit of the starting segment, and calculate a cell search result according to the SSS relevant information in the second time unit.

Accordingly, the first processing unit 321 is further configured to cache the SSS relevant information in the second time unit in the first space; and calculate SSS relevant information in a third time unit of the starting segment according to the PSS relevant information calculated in the first time unit of the starting segment and a time-domain signal received by the terminal in the third time unit of the starting segment, accumulate the SSS relevant information in the third time unit and the SSS relevant information cached in the first space to obtain third accumulated SSS relevant information, calculate a cell search result according to the third accumulated SSS relevant information, and clear the first space.

The second processing unit 322 is further configured to calculate SSS relevant information in the third time unit according to PSS relevant information calculated in the second time unit of the starting segment and the time-domain signal received by the terminal in the third time unit and cache the SSS relevant information in the third time unit in the second space; and calculate SSS relevant information in a fourth time unit according to the PSS relevant information calculated in the second time unit of the starting segment and a time-domain signal received by the terminal in the fourth time unit of the starting segment, accumulate the SSS relevant information in the fourth time unit and the SSS relevant information cached in the second space to obtain fourth accumulated SSS relevant information, calculate a cell search result according to the fourth accumulated SSS relevant information, and clear the second space.

In this embodiment of the present invention, two sets of independent resources for calculating cell search results exist on a terminal, the two sets of independent resources for calculating cell search results calculate, starting from a third time unit, cell search results in turn, and a cell search result is calculated based on multiframe accumulation each time. This improves search performance and ensures that a cell search result exists in each time unit, thereby accelerating an initial search and shortening an initial search delay.

A person of ordinary skill in the art may understand that all or a part of the steps of the foregoing embodiments may be implemented through hardware, or may be implemented by a program instructing relevant hardware. The program may be stored in a computer readable storage medium. The storage medium may be a read-only memory, a magnetic disk, or an optical disk.

The foregoing description is merely about the exemplary embodiments of the present invention, but is not intended to limit the present invention. Any modification, equivalent replacement, or improvement derived within the idea and principle of the present invention shall fall within the protection scope of the present invention.

What is claimed is:
1. A method for a cell search, comprising:
obtaining primary synchronization signal (PSS) relevant information in each time unit by calculation according to a time-domain signal received by a terminal in each time unit;
calculating first secondary synchronization signal (SSS) relevant information in an $i^{th}$ time unit according to PSS relevant information in a previous time unit of a cycle segment and a time-domain signal received by the terminal in the $i^{th}$ time unit of the cycle segment;

accumulating the first SSS relevant information in the $i^{th}$ time unit and SSS relevant information cached in a first space to obtain first accumulated SSS relevant information;

updating the SSS relevant information cached in the first space to the first accumulated SSS relevant information, wherein i is an integer;

calculating a cell search result according to the first accumulated SSS relevant information when i is an odd number;

calculating second SSS relevant information in the $i^{th}$ time unit according to PSS relevant information in a first time unit in the cycle segment and the time-domain signal received by the terminal in the $i^{th}$ time unit;

accumulating the second SSS relevant information in the $i^{th}$ time unit and SSS relevant information cached in a second space to obtain second accumulated SSS relevant information;

updating the SSS relevant information cached in the second space to the second accumulated SSS relevant information; and calculating a cell search result according to the second accumulated SSS relevant information when i is an even number.

2. The method according to claim 1, further comprising:
calculating SSS relevant information in the previous time unit of the cycle segment according to the PSS relevant information in the previous time unit of the cycle segment and a time-domain signal received by the terminal in the previous time unit of the cycle segment; and
caching the SSS relevant information in the previous time unit of the cycle segment in the first space.

3. The method according to claim 1, further comprising:
clearing the first space after calculating a cell search result according to the first accumulated SSS relevant information; and
clearing the second space after calculating a cell search result according to the second accumulated SSS relevant information.

4. The method according to claim 1, wherein a starting segment is further comprised before the cycle segment, wherein the starting segment comprises at least two time units, and wherein the method further comprises calculating SSS relevant information in a second time unit according to PSS relevant information calculated in a first time unit of the starting segment and a time-domain signal received by the terminal in the second time unit of the starting segment and calculating a cell search result according to the SSS relevant information in the second time unit.

5. The method according to claim 4, further comprising:
caching the SSS relevant information in the second time unit in the first space;
calculating SSS relevant information in a third time unit according to the PSS relevant information calculated in the first time unit of the starting segment and a time-domain signal received by the terminal in the third time unit of the starting segment;
accumulating the SSS relevant information in the third time unit and the SSS relevant information cached in the first space to obtain third accumulated SSS relevant information;
calculating a cell search result according to the third accumulated SSS relevant information; and
clearing the first space.

6. The method according to claim 5, further comprising:
calculating SSS relevant information in the third time unit according to PSS relevant information calculated in the second time unit of the starting segment and the time-domain signal received by the terminal in the third time unit;
caching the SSS relevant information in the third time unit in the second space;
calculating SSS relevant information in a fourth time unit according to the PSS relevant information calculated in the second time unit of the starting segment and a time-domain signal received by the terminal in the fourth time unit of the starting segment;
accumulating the SSS relevant information in the fourth time unit and the SSS relevant information cached in the second space to obtain fourth accumulated SSS relevant information;
calculating a cell search result according to the fourth accumulated SSS relevant information; and
clearing the second space.

7. A terminal for a cell search, comprising:
a first processing module;
a first processing unit; and
a second processing unit,
wherein the first processing module is configured to obtain primary synchronization signal (PSS) relevant information in each time unit by calculation according to a time-domain signal received by the terminal in each time unit,
wherein the first processing unit is configured to calculate first secondary synchronization signal (SSS) relevant information in an $i^{th}$ time unit according to PSS relevant information calculated in a previous time unit of a cycle segment and a time-domain signal received by the terminal in the $i^{th}$ time unit of the cycle segment, accumulate the first SSS relevant information in the $i^{th}$ time unit and SSS relevant information cached in a first space to obtain first accumulated SSS relevant information, update the SSS relevant information cached in the first space to the first accumulated SSS relevant information, wherein i is an integer, and calculate a cell search result according to the first accumulated SSS relevant information when i is an odd number, and
wherein the second processing unit is configured to calculate second SSS relevant information in the $i^{th}$ time unit according to PSS relevant information in a first time unit in the cycle segment and the time-domain signal received by the terminal in the $i^{th}$ time unit, accumulate the second SSS relevant information in the $i^{th}$ time unit and SSS relevant information cached in a second space to obtain second accumulated SSS relevant information, update the SSS relevant information cached in the second space to the second accumulated SSS relevant information, and calculate a cell search result according to the second accumulated SSS relevant information when i is an even number.

8. The terminal according to claim 7, wherein the first processing unit is further configured to calculate SSS relevant information in the previous time unit of the cycle segment according to the PSS relevant information in the previous time unit of the cycle segment and a time-domain signal received by the terminal in the previous time unit of the cycle segment, and cache the SSS relevant information in the previous time unit of the cycle segment in the first space.

9. The terminal according to claim 7, wherein the first processing unit is further configured to clear the first space after calculating the cell search result according to the first accumulated SSS relevant information, and wherein the second processing unit is further configured to clear the second space after calculating the cell search result according to the second accumulated SSS relevant information.

10. The terminal according to claim 7, wherein a starting segment is further comprised before the cycle segment, wherein the starting segment comprises at least two time units, and wherein the first processing unit is further configured to calculate SSS relevant information in a second time unit according to PSS relevant information calculated in a first time unit of the starting segment and a time-domain signal received by the terminal in the second time unit of the starting segment and calculate a cell search result according to the SSS relevant information in the second time unit.

11. The terminal according to claim 10, wherein the first processing unit is further configured to:
   cache the SSS relevant information in the second time unit in the first space;
   calculate SSS relevant information in a third time unit according to the PSS relevant information calculated in the first time unit of the starting segment and a time-domain signal received by the terminal in the third time unit of the starting segment;
   accumulate the SSS relevant information in the third time unit and the SSS relevant information cached in the first space to obtain third accumulated SSS relevant information;
   calculate a cell search result according to the third accumulated SSS relevant information; and
   clear the first space.

12. The terminal according to claim 11, wherein the second processing unit is further configured to:
   calculate SSS relevant information in the third time unit according to PSS relevant information calculated in the second time unit of the starting segment and the time-domain signal received by the terminal in the third time unit and cache the SSS relevant information in the third time unit in the second space;
   calculate SSS relevant information in a fourth time unit according to the PSS relevant information calculated in the second time unit of the starting segment and a time-domain signal received by the terminal in the fourth time unit of the starting segment;
   accumulate the SSS relevant information in the fourth time unit and the SSS relevant information cached in the second space to obtain fourth accumulated SSS relevant information;
   calculate a cell search result according to the fourth accumulated SSS relevant information; and
   clear the second space.

* * * * *